July 21, 1953 F. A. VENN 2,645,920
DRAPERY HOOK HOLDING DEVICE
Filed Feb. 7, 1950

INVENTOR.
FRANK A. VENN
BY Zugelter & Zugelter
Attys.

UNITED STATES PATENT OFFICE 2,645,920

DRAPERY HOOK HOLDING DEVICE

Frank A. Venn, Salem, Va.

Application February 7, 1950, Serial No. 142,846

1 Claim. (Cl. 68—235)

This invention relates to a device for holding drapery hooks during cleaning of a drapery.

An object of this invention is to provide a holder which can engage and hold a plurality of curtain hooks.

In the cleaning of draperies, it has heretofore been common to remove the hooks by which the draperies are hung before passing the draperies through dry cleaning solvents, for, unless the hooks are removed, the hooks may become tangled together and may catch parts of the drapery or other fabrics in the solvent and even may cause tearing of a drapery.

Accordingly, a further object of this invention is to provide a hook holding device which is adapted to grip and hold the drapery hooks as a drapery attached thereto is processed through a cleaning operation.

Briefly this invention provides a hook holder having two main members each of cup-shape, one of which fits inside the other. The bottom of the inner member is provided with a plurality of radial slots into which the free ends of the hooks project. The outer member is provided with a stud which extends through an opening at the center of the bottom of the inner member. A wing nut on the stud draws the cup-shaped members together to confine the hooks in the space between the cup-shaped members with the free ends of the hooks extending into the inside of the inner cup-shaped member. The cup-shaped members are preferably made of a non-rusting metal which will not mar or deface the fabrics or react with the solvents or under the action of heat incident to the drying operation. When the hooks are held by the hook holding device, the drapery can be processed through cleaning liquids and dried without removing the hooks.

The above and other objects and features of the invention will in part be apparent and will in part be obvious from the following detailed description, and the drawing, in which.

In the following detailed description, and the drawing, like reference characters indicate like parts.

Figure 2:
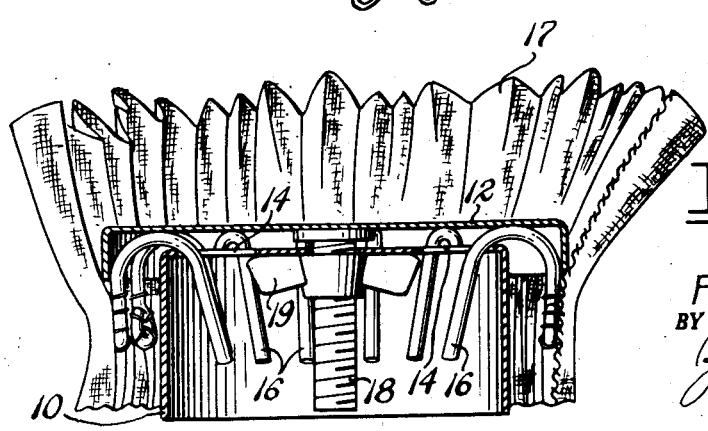
Fig. 2 is a sectional view taken along a line II—II in Fig. 1.

As shown in Fig. 2, the hook holding device includes a cup-shaped inner member 10 and a cup-shaped outer member 12. The bottom of the inner member is provided with a central aperture 13' and a plurality of radially extending slots 14. As shown in Fig. 2, the free ends of drapery hooks 16 are adapted to extend through the radial slots 14, each of the slots receiving the free end of one of the hooks.

Figure 3:
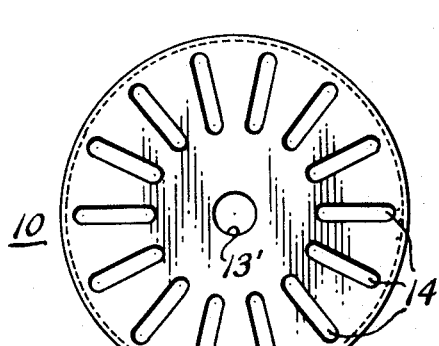
Fig. 3 is a plan view of the inner cup-shaped member of the device illustrated in Fig. 1.
Figure 4:
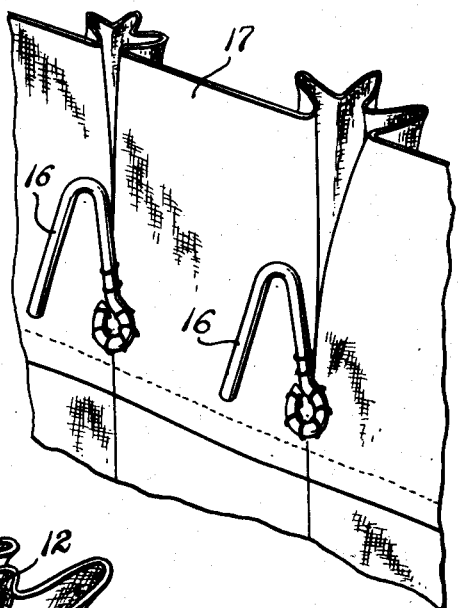
Fig. 4 is a fragmentary perspective view of the upper portion of a drapery showing drapery hooks attached thereto.
Figure 1:
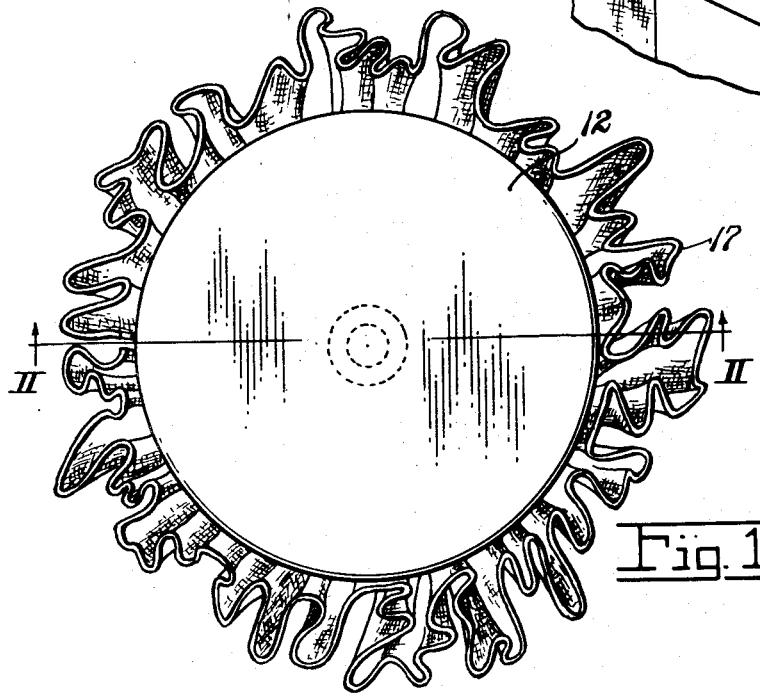
Figure 1 is a plan view of a hook holding device constructed in accordance with an embodiment of this invention, the device being shown in conjunction with a drapery, the hooks of which are held by the device.

As shown in Fig. 4, the drapery hooks may be sewed to the upper portion of a drapery 17 in the usual manner. The hooks remain attached to the drapery during cleaning, and the free ends of the hooks are held between the inner and outer cup-shaped members 10 and 12.

The outer cup-shaped member 12 has a somewhat greater diameter than the inner cup-shaped member and fits over the inner cup-shaped member and embraces the drapery hooks 16. A stud 18 attached to the center of the bottom of the outer cup-shaped member extends through the aperture 13' of the inner cup-shaped member. A wing nut 19 threaded to the stud 18 is adapted to pull the outer cup-shaped member toward the inner cup-shaped member, thereby confining the hooks in the space between the two cup-shaped members and gripping the hooks firmly. When the cup-shaped members are so assembled, the drapery can be processed through cleaning fluid and drying equipment in the usual manner. The cup-shaped members are preferably made of rust-proof metals such as the alloy consisting essentially of nickel and copper commonly known as "Monel" metal or other similar metal which will not in any way mark or deface the fabrics and which is unaffected by the cleaning chemicals or fluids and by the heat incident to the drying operation.

The hook holding device described above and illustrated in the drawing is subject to structural modifications without departing from the spirit and scope of the appended claim.

Having described my invention, what I claim as new and desire to secure by Letters Patent is:

A device for securing and housing sewed-on hooks of a drapery while the same is being cleaned to protect the drapery against damage from the hooks, said device comprising an inner cup-shaped member, the bottom of said inner cup-shaped member being provided with a plurality of angularly spaced slots, each of said slots being spaced from the peripheral edge of the bottom of said inner member, each of said slots being adapted to receive one of the hooks with the shank of the hook on the outside of the inner cup-shaped member, an outer cup-shaped member of greater diameter than the inner member, the outer cup-shaped member facing in the same direction as the inner cup-shaped member and being adapted to cover the bottom of the inner member and engage and hold the central portion of each hook against the bottom of the inner member with the lip of the outer member overlying the side of the inner member and projecting between the drapery and the hooks, and means for securing the bottoms of the cup-shaped members together to engage and clamp the hooks.

FRANK A. VENN.

References Cited in the file of this patent

UNITED STATES PATENTS

| Number | Name | Date |
|---|---|---|
| 245,482 | Gray | Aug. 9, 1881 |
| 1,418,563 | Hamilton | June 6, 1922 |
| 1,539,915 | Shebat | June 2, 1925 |
| 2,186,543 | Henry | Jan. 9, 1940 |
| 2,447,105 | Vogel | Aug. 17, 1948 |
| 2,447,924 | Vitale | Aug. 24, 1948 |
| 2,501,425 | Valentine | Mar. 21, 1950 |